United States Patent
Keller

(10) Patent No.: US 8,494,664 B2
(45) Date of Patent: Jul. 23, 2013

(54) INTEGRATED DRIVE MANAGEMENT AND CONFIGURATION USING INSTANTIATED OBJECTS

(75) Inventor: Michael R. Keller, Menomonee Falls, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 13/228,243

(22) Filed: Sep. 8, 2011

(65) Prior Publication Data

US 2011/0320017 A1    Dec. 29, 2011

Related U.S. Application Data

(63) Continuation of application No. 11/835,495, filed on Aug. 8, 2007, now abandoned.

(51) Int. Cl.
| | |
|---|---|
| *G05B 19/42* | (2006.01) |
| *G05B 19/18* | (2006.01) |
| *G05B 21/02* | (2006.01) |
| *G06F 19/00* | (2011.01) |
| *G06F 9/00* | (2006.01) |
| *G01R 31/28* | (2006.01) |

(52) U.S. Cl.
USPC ........ 700/86; 700/7; 700/18; 700/73; 700/87; 700/204; 713/1

(58) Field of Classification Search
USPC .... 700/7, 18, 73, 86, 87, 204; 713/1; 714/725
See application file for complete search history.

(56) References Cited

U.S. PATENT DOCUMENTS

| | | | |
|---|---|---|---|
| 6,076,752 A * | 6/2000 | Paradowski et al. | 241/16 |
| 6,308,113 B1 * | 10/2001 | Nowlin et al. | 700/245 |
| 6,618,856 B2 * | 9/2003 | Coburn et al. | 717/135 |
| 6,993,456 B2 * | 1/2006 | Brooks et al. | 702/183 |
| 2004/0098148 A1 * | 5/2004 | Retlich et al. | 700/83 |
| 2008/0094014 A1 * | 4/2008 | Dawson | 318/270 |
| 2011/0022195 A1 * | 1/2011 | Plache et al. | 700/83 |

* cited by examiner

*Primary Examiner* — Kavita Padmanabhan
*Assistant Examiner* — Thomas Stevens
(74) *Attorney, Agent, or Firm* — Alexander R. Kuszewski; Boyle Fredrickson, S.C.; John M. Miller

(57) ABSTRACT

A programming tool provides an interface between an industrial controller and a motor drive that allows the logic development tool used to program the industrial controller to be used to configure the motor drive and its supported components directly. This allows a programmer to configure the topology for the motor drive and provide configuration data that can be verified directly from within the controller programming software rather than requiring separate programming and diagnostic tools.

20 Claims, 4 Drawing Sheets

INTEGRATED DRIVE MANAGEMENT AND CONFIGURATION USING INSTANTIATED OBJECTS

CROSS-REFERENCE TO RELATED APPLICATIONS

This application is a continuation of U.S. application Ser. No. 11/835,495, filed Aug. 8, 2007 now abandoned, the disclosure of which is hereby incorporated by reference in its entirety for all purposes.

BACKGROUND OF THE INVENTION

The present invention relates to an industrial control system used for real-time control of industrial processes, and in particular, to integrated drive management and configuration using instantiated objects. One aspect of the invention allows a drive or other peripheral component of an industrial process to be configured using the logic development tool customarily used to configure or otherwise program an industrial controller of the industrial process.

Industrial controllers are special purpose computers used for controlling industrial processes and manufacturing equipment on a real-time basis. Under the direction of a stored program, the industrial controller examines a set of inputs reflecting the status of the controlled process and changes a set of outputs controlling the industrial process. The inputs and outputs may be binary, which is on or off, or analog, providing a value within a continuous range. Typically analog signals are converted to binary words for processing. Industrial controllers differ from conventional computers in that their hardware configurations vary significantly from application to application reflecting their wide range of uses. This variability is accommodated by constructing the industrial controller on a modular basis having removable input and output (I/O) modules that may accommodate different numbers of input and output points depending on the process being controlled. The need to connect the I/O modules to different pieces of machinery that may be spatially separated has led to the development of a remote I/O rack holding a number of I/O modules at a remote location to communicate with a central processor of the industrial control via an adapter module, which in turn is connected with a high speed network linked to the central processor. The adapter exchanges information between the network and the I/O modules.

Industrial controllers further differ from conventional computers in that they must process a large amount of input and output data on a predictable real-time basis. This requires not only that the response time of the industrial controller be extremely fast, but also that the processing delay between a changing input and the response of a reacting output be consistent so that the controller operates predictably over time.

To satisfy these requirements of speed and consistency, many industrial controllers use a "scan" based architecture in which each input and output are sequentially read and written over repeated scans of regular duration. Newer industrial controllers may use a producer/consumer model which allows I/O modules to produce data when sampled rather than waiting for a controller scan. This produce/consume protocol may also be used in the communication between an adapter module and the I/O modules of a remote I/O rack. The immediate production of data makes the data available to be used in the system as quickly as possible and reduces overhead on the controller to actively scan all inputs, even when no new data is available. During operation of an industrial process, the industrial controller consumes data produced by the I/O modules, which acquires or samples data from various components of the industrial process, in a timed loop. Those various components include motor drives and other peripheral devices adapted to carry out various functions of the industrial process.

Industrial controllers execute a stored program to control the industrial process. In this regard, industrial controllers are programmable devices and, as such, are also referred to as programmable logic controllers (PLCs). A number of programming tools have been used to program PLCs for industrial applications. One such programming tool is RSLogix 5000, commercially available from Rockwell Automation, Milwaukee, Wis. These programming tools not only enable a programmer to configure the PLC, but may also present generic profiles of various components of the industrial process, such as a motor drive. The generic profiles provide the programmer with information regarding the supported component so that information can be considered during programming of the PLC; however, the programmer is unable to configure the component, e.g., motor drive, directly within the context of the PLC programming tool. In this regard, a separate programming tool, specific for configuring the component, such as DriveTools, commercially available from Rockwell Automation, Milwaukee, Wis., is required to be launched, either directly by the programmer or by the PLC programming tool, to enable the operator to configure the component. The separate programming tools result in a disconnect that can make programming of the PLC and the controlled components, e.g. motor drives, difficult.

More particularly, the PLC communicates with a drive through a communications module. For the drive to be fully operational, the drive as well as the communications module must be configured. In this regard, an elaborate communications framework has been established in which configuration data is not passed between the PLC and the drive unless the communications module allows the communication. Even if the initial communications hurdles are overcome and the communications module passes the configuration data to the motor drive, the PLC is unable to verify that the data was, in fact, properly received by the motor drive. The PLC can only verify that the communications module accepted the communication.

As a result of the independence between the PLC and the communications module, the PLC cannot verify that the configuration data, even if received, has been properly mapped to parameters of the motor drive. This can be particularly problematic since the mapping mechanism used to map the configuration data to the motor drive is typically unique for the motor drive. If the mapping to the parameters of the motor drive is incorrect, the configuration data may not be stored correctly or the communications module may not permit the data transfer altogether. As a result, a separate error checking tool must be used to verify configuration of the drive and the communications module.

BRIEF SUMMARY OF THE INVENTION

The present inventors have developed a programming tool for integrated controller and motor drive management and configuration that overcomes the drawbacks associated with conventional motor drive programming tools. The inventive programming tool provides an interface between the controller and a motor drive that allows the logic development tool used to program the industrial controller to be used to configure the motor drive and its supported components directly. As such, a programmer can program the motor drive in the context of the programming software used to configure the controller. More particularly, within the context of the programming software for the controller, a programmer can configure the topology for the motor drive and provide configuration data (typically parameters) that can be verified directly from within the controller programming software. Motor drive configuration data is typically provided via parameters but may also consist of other types of data.

It is therefore an object of the present invention to provide an industrial control system having motor drives that are configured using the logic development tool customarily used to configure industrial controllers of the industrial control system.

It is also an object of the invention to provide instantiated motor drive objects that create a data structure holding configuration data for a particular motor drive, guide user entry of configuration data into the data structure using data names specific to the particular motor drive, and manage the transfer of the configuration data from a PLC to the particular motor drive when executed on the PLC.

The foregoing and other aspects of the invention will appear from the following description. In the description, reference is made to the accompanying drawings, which form a part hereof, and in which there is shown by way of illustration a preferred embodiment of the invention. Such embodiment does not necessarily represent the full scope of the invention, however, and reference must be made to the claims herein for interpreting the scope of the invention.

DETAILED DESCRIPTION OF THE INVENTION

Figure 1:
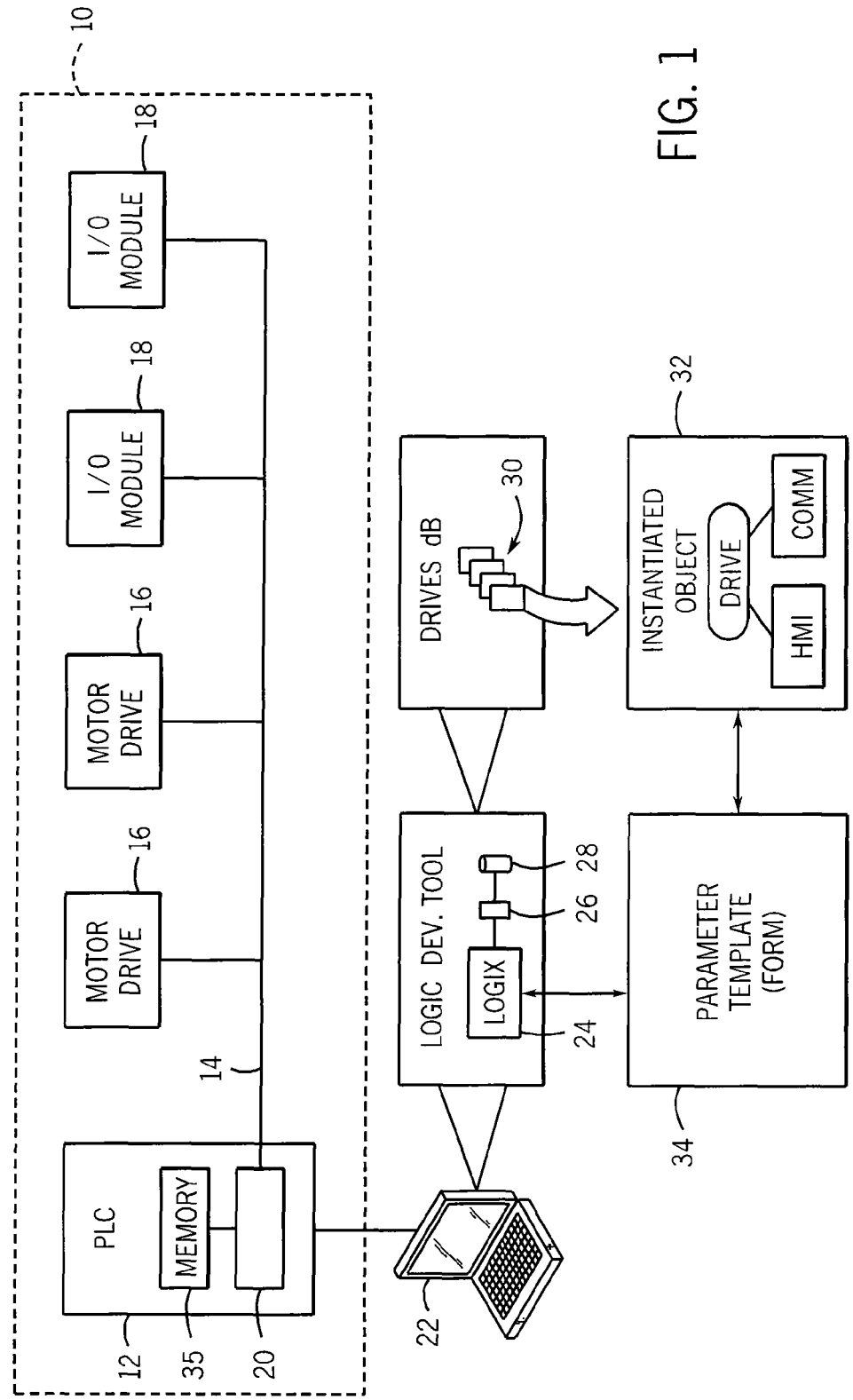
FIG. 1 is a simplified diagram of an industrial process and a programming workstation used to program or configure components of the industrial process.

FIG. 1 depicts a general framework of an industrial control system and a computer used to configure the industrial control system. In this regard, the industrial control system 10 includes an industrial controller or PLC 12 that communicates with various components used to monitor or operate an industrial process. An exemplary industrial control system is described in U.S. Pat. No. 6,662,247, the disclosure of which is incorporated herein. Communication between the controller 12 and the controlled components is preferably across a high-speed, serial network 14, which may be any one of a number of high-speed serial networks including ControlNet, EtherNet, or the like. Exemplary components include motor drives 16 and I/O modules 18.

The controller 12 includes a stored software program, shown as block 20, that is stored in memory of the controller and includes executable code that when executed by the controller 12 causes the controller to control operation of the drives 16, I/O modules 18, and other controlled components of the industrial control system 10, as is well-known in the art.

A workstation 22 may be connected to the controller 12 to program the controller 12, i.e., write or edit program 20. In a preferred embodiment, workstation 22 includes a computer loaded with a software application 24 designed to allow a user to program the controller 12. One exemplary programming language is RSLogix 5000, commercially available from Rockwell Automation, Milwaukee, Wis. The controller programming application or tool 24, which may consist of multiple applications bundled in a programming suite, presents various user interfaces to guide a programmer in the programming, i.e., establishing control logic, for the industrial controller 12. Additionally, the workstation 22 includes applications that facilitate programming of motor drive 16 within the context of the controller programming tool, as will be described.

More particularly, the workstation 22 accesses, either from local memory or an external memory location such as a server, an add-on configuration interface program 26 that provides integration between the software application 24 and a motor drive object database 28. The motor drive object database 28 contains object models of various motor drives that can be instantiated, as desired. For instance, a particular motor drive may be used repeatedly throughout an industrial control process. To configure each instance of this particular motor drive, multiple instantiations of the object model of the motor drive may be generated and separately and individually configured to carry out respective functions within the industrial process. Because the configuration interface program 26 is integrated with the software application 24 and is linked to the motor drive object database 28, a user can instantiate one or more object models 30 of a motor drive for configuration directly within the software application 24 to create particular instantiated objects 32.

The instantiated objects 32 contain data, when instantiated by the user, configure operation of the motor drive associated with the instantiated object 32. Moreover, the instantiated objects 32 contain programs that guide the programmer during configuration of the associated motor drive by presenting a graphical template or form 34 identifying configurable parameters for the motor drive by name or other recognizable identifier. Thus, there is a direct mapping between the configuration data of the object and the motor drive. The configuration data for a particular motor drive may then be stored in the data structure of the associated instantiated object and subsequently written to the corresponding motor drive to configure the motor drive. That is, after a programmer has configured the instantiated object for a particular motor drive, the configuration data is stored in memory 35 of the controller 12 and then communicated to the actual motor drive 16 by the controller to complete the configuration process. The instantiated objects 32 also include programming to manage communication of the configuration data to their associated motor drives and interfacing with a Human-Machine Interface (HMI).

Figure 2:
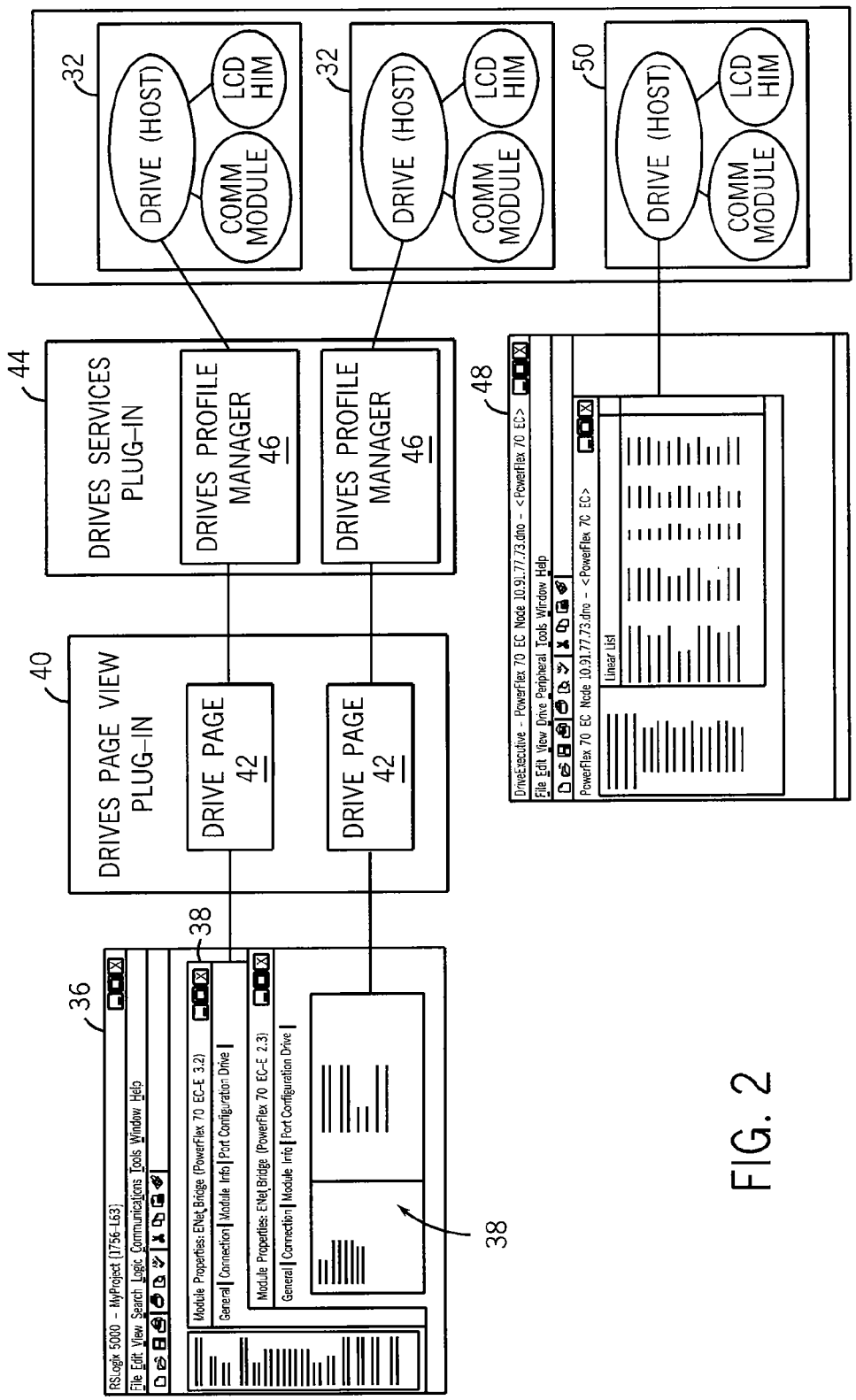
FIG. 2 is a block diagram showing a framework for configuring an industrial controller and a motor drive of the industrial process with a motor drive offline.

Referring now to FIG. 2, an implementation of the present invention is shown for configuring offline motor drives 16 within the context of the software application 24 used to program an industrial controller 12. The software application 24 provides a configuration project window 36 into which user interfaces 38 for one or more motor drives may be displayed. The user interfaces 38 are provided by a drive page view plug-in 40 that provides a launch/navigation point for the controller programming tool and the specific components of an instantiated motor drive object 32. In the illustrated example, two separate instantiated motor drive objects 32 are shown, with each having an associated drive page 42 that is provided to the software application for viewing as a user interface 38 within the context of the configuration project window 36. Changes made in the user interfaces 38 are automatically communicated to the instantiated motor drive objects 32 by a drives services plug-in 44 that provides a respective drives profile manager 46 for each instantiated object 32 to provide a mapping between the configuration data input on the user interfaces 38 to actual parameters of the motor drive.

As shown in FIG. 2, multiple instantiated motor drive objects 32 may be simultaneously active and configured. Moreover, as further shown in the figure, multiple applications can access different instantiated motor drive objects. For example, diagnostic application 48, such as DriveExecutive, part of the RSLogix suite of products from Rockwell Automation of Milwaukee, Wis., may interface with one instantiated object 50 whereas the other instantiated objects are accessed by the programming tool.

Figure 3:
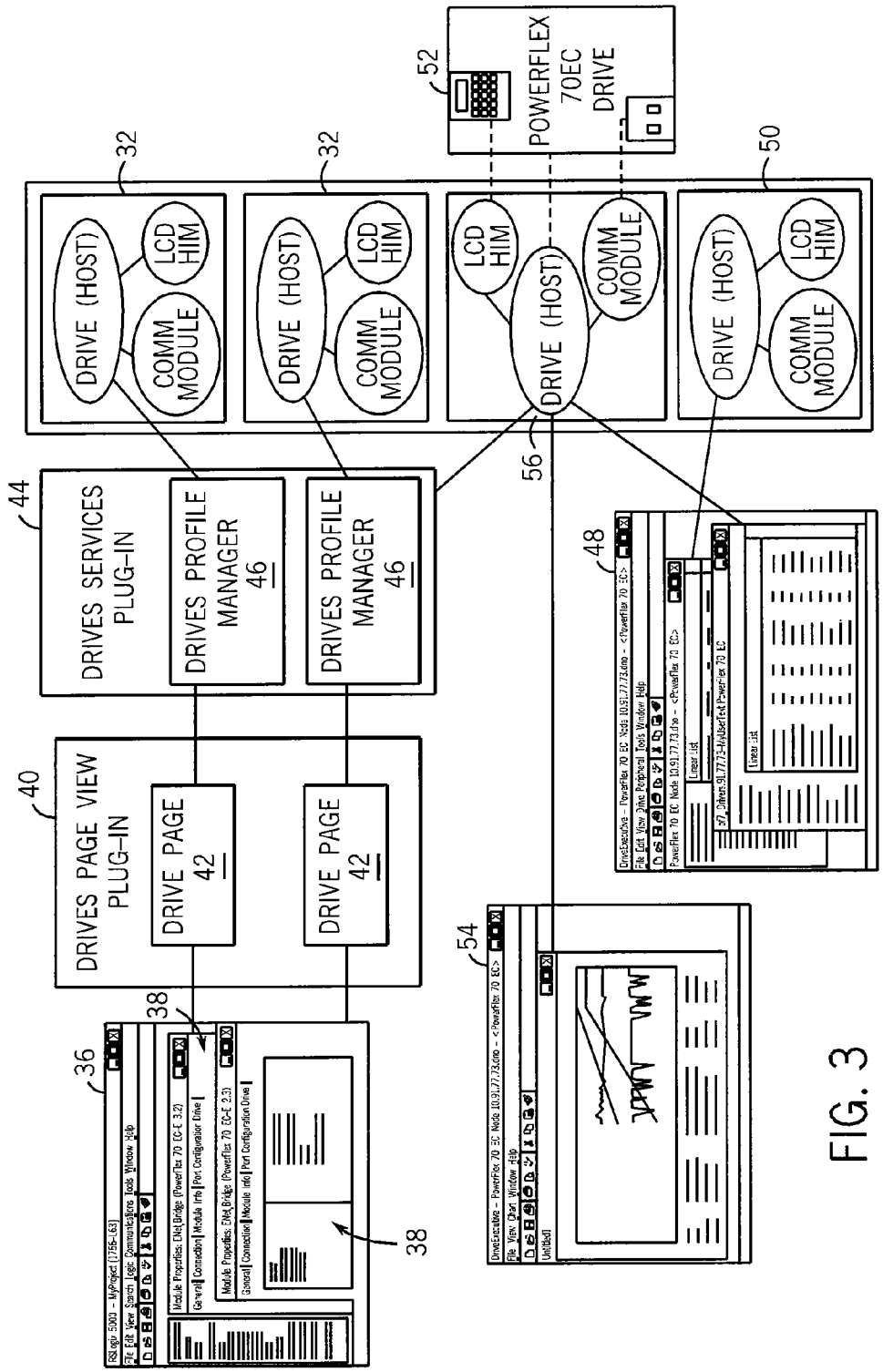
FIG. 3 is a block diagram showing a framework for configuring an industrial controller and a motor drive of the industrial process while a motor drive is online.

As shown in FIG. 3, when a motor drive 52 is online, i.e., connected to the controller 12, multiple applications such as the drives services plug-in 44, and separate diagnostic applications 48, 54 may access a single instantiated object 56 associated with motor drive 52. Also, changes made to the configuration data of instantiated object 56 are automatically visible by the other applications accessing the instantiated object 56. In this regard, changes made to an instantiated object 56 are synchronized so that all applications viewing that instantiated object 56 see the changes in the configuration data.

Figure 4:
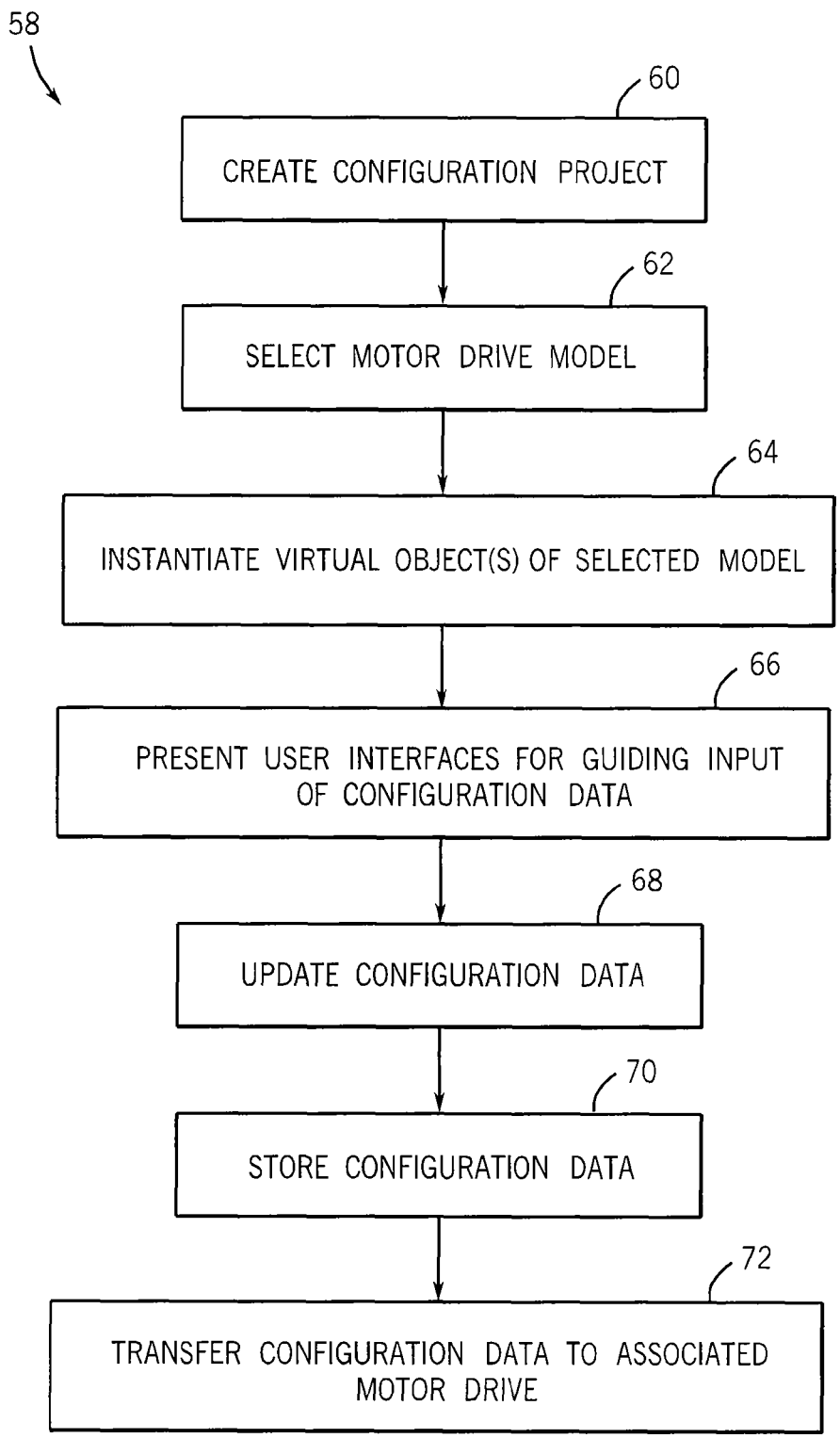
FIG. 4 is a flow chart setting forth the steps of configuring a motor drive according to one aspect of the present invention.

Referring now to FIG. 4, the present invention is also embodied in a method for configuring a motor drive within the context of an industrial controller programming tool 24. The method 58, which may be embodied in a computer program stored on a tangible and reproducible medium, is initiated to create a configuration file per process block 60 that is stored in the context of the industrial controller programming tool. After creating the configuration file per process block 60, the programmer then selects a motor drive model per process block 62 that corresponds to a motor drive to be used in the industrial process. The motor drive model is associated with a motor drive object that can then be instantiated per process block 64 to enable the programmer to configure an instantiated object of the motor drive. The instantiated object 32 guides the programmer though the configuration process by presenting user interface components per process block 66 that allow the programmer to establish values for various parameters of the motor drive per process block 68. The configuration of the instantiated object 32 is then stored per process block 70 as a corresponding image in the controller that is transferred to the motor drive during finalization of the motor drive configuration at process block 72.

While configuration of a motor drive has been described, it is understood that other controlled components of an industrial process may be similarly configured.

The present invention has been described in terms of the preferred embodiment, and it is recognized that equivalents, alternatives, and modifications, aside from those expressly stated, are possible and within the scope of the appending claims.

I claim:

1. A computer-implemented method of configuring a motor drive associated with a controller during programming of the controller, the method comprising:

executing a logic development tool on a computer for creating a control program providing logical instructions executable on the controller for controlling the motor drives;

selecting a motor drive object from a motor drive object database holding motor drive objects for multiple motor drives, the motor drive objects, when instantiated, receiving and holding configuration data that will configure operation of a motor drive associated with the instantiated motor drive object;

using the controller to instantiate, by the logic development tool, the selected motor drive object for the motor drive communicating with the controller;

creating a data structure holding configuration data for the motor drive through the instantiated motor drive object;

guiding user entry of configuration data into the data structure using data names specific to the motor drive using the logic development tool through the instantiated motor drive object; and managing transfer of the configuration data from the controller to the motor drive through the instantiated motor drive object, whereby the logic development tool configures the motor drive using instantiated motor drive objects.

2. The method of claim 1 further comprising configuring the motor drive based on the configuration data of the motor drive object.

3. The method of claim 1 wherein the motor drive object is called from a database containing object models for a plurality of controlled components.

4. The method of claim 1 further comprising initiating a parameter list editor to which a user may define parameters for the motor drive.

5. The method of claim 1 further comprising configuring the motor drive object for the motor drive while the motor drive is online and thus operatively connected to the controller.

6. The method of claim 1 further comprising configuring the motor drive object for the controlled component while the motor drive is offline and thus operatively disconnected to the controller.

7. The method of claim 1 further comprising initiating a graphical diagram editor to which a user may define parameters for the motor drive.

8. The method of claim 1 further comprising initiating drive specific application wizards that allow a user to configure the motor drive using application specific graphically rich tools.

9. The method of claim 1 further comprising initiating device specific configuration and diagnostic tools that allow a user to configure, monitor and troubleshoot motor drives.

10. A computer-implemented system for configuring a motor drive associated with a controller during programming of the controller, the system comprising:

a logic development tool executed on a computer for creating a control program providing logical instructions executable on the controller for controlling the motor drives;

a motor drive object database holding motor drive objects for multiple motor drives, the motor drive objects, when instantiated, receiving and holding configuration data that will configure operation of a motor drive associated with the instantiated motor drive object;

whereby the controller is configured to instantiate, by the logic development tool, a selected motor drive object for the motor drive communicating with the controller;

create a data structure holding configuration data for the motor drive through the instantiated motor drive object;

guide user entry of configuration data into the data structure using data names specific to the motor drive using the logic development tool through the instantiated motor drive object; and manage transfer of the configuration data from the controller to the motor drive through the instantiated motor drive object, whereby the logic development tool configures the motor drive using instantiated motor drive objects.

11. The system of claim 10, where the motor drive is configured based on the configuration data of the motor drive object.

12. The system of claim 10, wherein the motor drive object is called from a database containing object models for a plurality of controlled components.

13. The system of claim 10, wherein the logic development tool is further configured to initiate a parameter list editor to which a user may define parameters for the motor drive.

14. The system of claim 10, wherein the motor drive object for the motor drive is configured while the motor drive is online and thus operatively connected to the controller.

15. The system of claim 10, wherein the motor drive object for the controlled component is configured while the motor drive is offline and thus operatively disconnected to the controller.

16. The system of claim 10, wherein the logic development tool is further configured to initiate a graphical diagram editor to which a user may define parameters for the motor drive.

17. The system of claim 10 wherein the logic development tool is further configured to initiate drive specific application wizards that allow a user to configure the motor drive using application specific graphically rich tools.

18. The system of claim 10, wherein the logic development tool is further configured to initiate device specific configuration and diagnostic tools that allow a user to configure, monitor and troubleshoot motor drives.

19. A computer-implemented method of configuring a motor drive associated with a controller during programming of the controller, the method comprising:

executing a logic development tool on a computer for creating a control program providing logical instructions executable on the controller for controlling the motor drives;

selecting a motor drive object from a motor drive object database holding motor drive objects for multiple motor drives, the motor drive objects, when instantiated, receiving and holding configuration data that will configure operation of a motor drive associated with the instantiated motor drive object;

using the controller to instantiate, by the logic development tool, the selected motor drive object for the motor drive communicating with the controller;

creating a data structure holding configuration data for the motor drive through the instantiated motor drive object;

receiving configuration data into the data structure using data names specific to the motor drive using the logic development tool through the instantiated motor drive object; and managing transfer of the configuration data from the controller to the motor drive through the instantiated motor drive object, whereby the logic development tool configures the motor drive using instantiated motor drive objects.

20. The method of claim 19, further comprising configuring the motor drive based on the configuration data of the motor drive object.

* * * * *